(12) United States Patent
Jakubowski et al.

(10) Patent No.: US 7,584,364 B2
(45) Date of Patent: Sep. 1, 2009

(54) OVERLAPPED CODE OBFUSCATION

(75) Inventors: Mariusz H. Jakubowski, Bellevue, WA (US); Matthias Jacob, Princeton, NJ (US)

(73) Assignee: Microsoft Corporation, Redmond, WA (US)

( * ) Notice: Subject to any disclaimer, the term of this patent is extended or adjusted under 35 U.S.C. 154(b) by 936 days.

(21) Appl. No.: 11/125,370

(22) Filed: May 9, 2005

(65) Prior Publication Data
US 2006/0253687 A1   Nov. 9, 2006

(51) Int. Cl.
*G06F 11/30* (2006.01)
(52) U.S. Cl. .................. 713/190; 713/189; 726/22; 726/26; 717/108; 717/118; 717/210
(58) Field of Classification Search .................. 713/189
See application file for complete search history.

(56) References Cited

U.S. PATENT DOCUMENTS

| 7,363,620 | B2 * | 4/2008 | de Jong | 717/141 |
| 2005/0069138 | A1 * | 3/2005 | de Jong | 380/278 |

* cited by examiner

*Primary Examiner*—David Cervetti
*Assistant Examiner*—Fikremariam Yalew
(74) *Attorney, Agent, or Firm*—Lee & Hayes, PLLC

(57) ABSTRACT

A method of code obfuscation includes receiving a code segment. The existing code of the code segment is modified and/or additional code injected to create overlapped code. The overlapped code performs a plurality of semantically different actions depending upon the content of execution. The resulting obfuscated code having overlapped code is then output.

20 Claims, 4 Drawing Sheets

OVERLAPPED CODE OBFUSCATION

BACKGROUND

The open nature of conventional computing environments allows easy observation and modification of executing code, enabling individuals to reverse engineer, tamper with, or hack software. To address this problem, various code obfuscation techniques endeavor to transform programs into forms difficult to understand and modify. However, there is no current obfuscation algorithm that is substantially secure and practical.

With the growing popularity of software and electronic media distribution and the increasing economic investments made therein, the importance of protection techniques is expected to grow. Therefore, there is a need for improved code obfuscation techniques that are effective against reverse engineering, tampering and hacking.

SUMMARY

The code obfuscation techniques described herein are directed toward creating overlapping code for improved obfuscation. In one embodiment, an existing code segment, that performs a single action, is modified and/or additional code is injected to create overlapped code within the code segment. The overlapped code performs two or more semantically different actions depending upon the context of execution. The overlapped code obfuscation technique may be repeatedly applied to the code segment to achieve a desired level of "confusion" and "diffusion". Furthermore, other conventional obfuscation techniques may also be applied to further increase the level of confusion and diffusion. The resulting overlapped code complicates code analysis, decompiling, disassembly, patching, and/or the like.

BRIEF DESCRIPTION OF THE DRAWINGS

Embodiments of the present invention are illustrated by way of example and not by way of limitation, in the figures of the accompanying drawings and in which like reference numerals refer to similar elements and in which.

DETAILED DESCRIPTION

Systems and methods are described herein for transforming code segments that perform a single action into code segments having overlapped code. The overlapped code performs a plurality of semantically different actions. The semantically different actions may be implemented utilizing multiple overlapping paths of execution, overlapped instruction and/or the like. The particular one of the plurality of actions performed during execution of the overlapped code may be a function of the context of execution.

Figure 1:
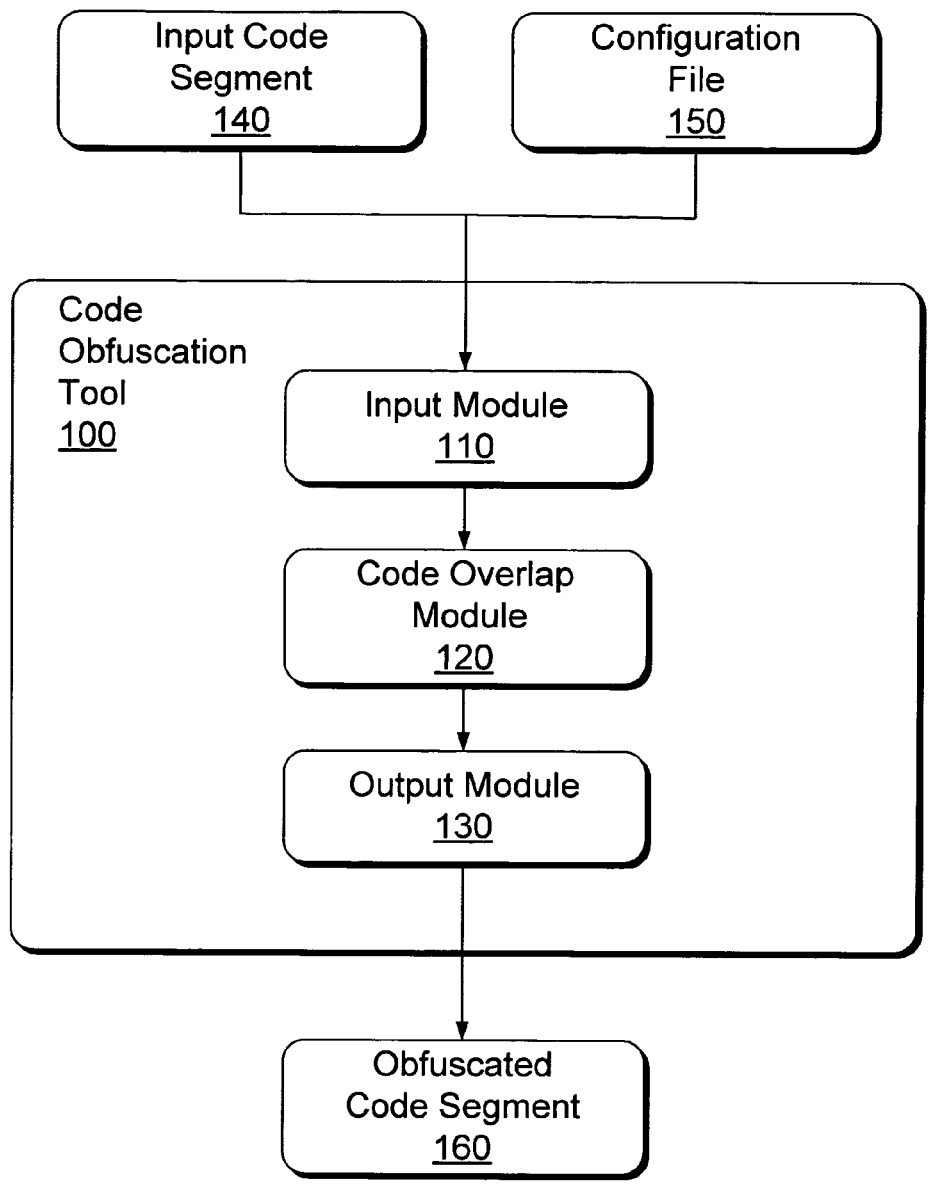
FIG. 1 shows a block diagram of a code obfuscation tool.

FIG. 1 shows an exemplary code obfuscation tool 100 that includes an input module 110 and an output module 130 communicatively coupled to a code overlap module 120. The input module 110 receives one or more code segments 140. The received code segments 140 may be of any form, such as source code, intermediate code, binary code, or the like. The code overlap module 120 is adapted to create overlapped code in the received code segments 140. The output module 130 issues the resulting obfuscated code 160.

The code overlap module 120 modifies the received code segment and/or inserts additional code to create the overlapped code. The overlapped code performs a plurality of semantically different actions depending upon the context of execution. The particular action performed during execution may be a function of one or more parameters, such as the current code path, program counter, time, running thread, value of a variable, program input, data derived from a program input, content of a register, or the like.

The modified and/or inserted code may include overlapping instructions (e.g., overlapped machine code or byte code). For example, one or more operand bytes of a first instruction (e.g., a move, add or the like instruction) may also have the same byte pattern as the opcode of another instruction (e.g., a no-operation instruction). A branch or jump may be used to transfer execution to the operand of the first instruction, which is the opcode of the other instruction. Thus, a particular group of bytes may encode different instructions, depending upon the exact address to which execution is transferred. Disassembly of such code results in two or more possible disassembly listings for the same byte sequence, and it is hard to find out which is the correct one.

In addition, the modified and/or inserted code may include branches, jumps, fake instructions, useless code and/or cold path to create multiple overlapping paths of execution. The modified and/or inserted code for creating multiple overlapping paths of execution may also include equivalent but individualized instructions. For example, a code segment of a game program may perform an action such as incrementing a variable. For a first path the variable relates to a score. For a second path the variable relates to a damage level. The particular action performed during execution depends upon the path of execution. Thus, if a patch is inserted to increase the score it will also increase the amount of damage.

The modified and/or inserted code may also include necessary but nonequivalent code. For example, existing instructions of a program may be embedded in obfuscated patterns. If the obfuscated patterns are deleted, one or more instructions necessary for operation of the program are also deleted. Accordingly, the overlapped code is tamper-resistant.

The modified and/or inserted code may also include opaque predicates. Opaque predicates include conditional statements for which the condition is difficult to determine by reverse engineering. The opaque predicate may be utilized to protect jumps and branches that transfer execution into the middle of instructions or into a given one of a plurality of execution paths. Thus, it is not readily determinable which execution path contains useless code, cold paths or the like. Exemplary opaque predicates may include branches (e.g., cmp eax, const . . . jle), direct jumps (e.g., jne SKIP), indirect jumps combined with a compare (e.g., cmp . . . jmp eax) or call/return function statements.

It is appreciated that there are many variants on the above-described implementations. Furthermore, the overlapped code may also be distributed throughout a software program. Overlapped code may be distributed more heavily in crucial code. Some trivial code may also have overlapped code distributed within to deflect attention away from sensitive code. The overlapped code may also include some random parameters to prevent easy classification and removal.

Figure 2:
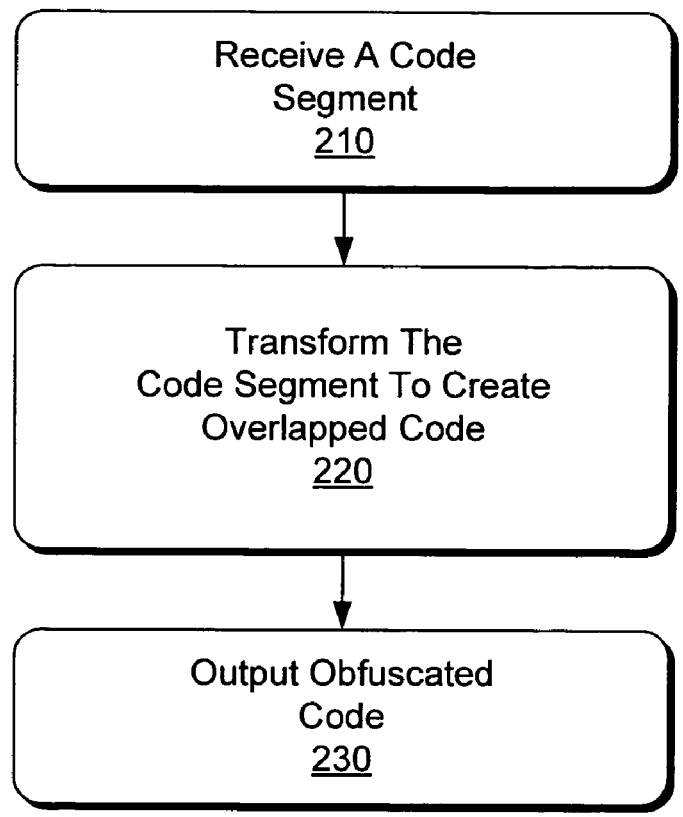
FIG. 2 shows a flow diagram of a method of obfuscating code.

FIG. 2 shows a method of obfuscating code. The method begins with receipt of a code segment, at 210. The code segment may be of any form, such as source code, intermediate code, binary code, or the like. At 220, the received code segment is transformed to perform a plurality of semantically different actions as a function of a context of execution. In particular, the existing code is modified and/or additional code is injected into the code segment to create overlapped code.

The overlapped code may be created by overlapping one or more instructions. More specifically, a particular sequence of bytes may be modified and/or additional bytes inserted such that one or more bytes comprise an opcode of a first instruction and one or more other bytes comprise the operand of the first instruction and also an opcode of a second instruction. It is appreciated that overlapped code only works on platforms that support variable-length instructions. For example, x86 and AMD64 platforms support variable-length instruction sets. However, platforms such MIPS and SPARC do not support variable-length instruction sets.

An inserted jump instruction causes execution to be transferred to the opcode of the second instruction. Accordingly, the overlapping instructions result in two or more possible disassembly listings for the same byte sequence. For example, in a Win32 (e.g., Microsoft Windows operating system) binary implementation, an IA-32 (e.g., Intel x86 processor architecture) branch or jump instruction may be utilized to transfer control into the middle of another instruction, as follows:

cmp eax, eax
jne SKIP
_emit 0xb8
SKIP: (Code continues here.)

The byte 0xb8 is the Intel x86 opcode for a MOV EAX instruction normally followed by a 4-byte operand. Accordingly, there are two possible disassemblies depending upon whether or not the branch is taken.

It is appreciated that a user of an interactive disassembler (e.g., DataRescue's IDA) can instruct the disassembler which branch to take, foiling the obfuscation. However, the disassembler cannot determine which branch is better. Instead, the user must examine the code sequences and determine manually how best to disassemble them. Thus, if enough macros, code patterns or the like of sufficient complexity are utilized, one can at least force a user of the disassembler to spend a prohibitive amount of time to reverse engineer the obfuscated code.

The anti-disassembly code may be improved by making the branch conditions less obvious. For example, the obfuscated code may be as follows:

Call TestFun
jne SKIP
_emit 0xb8
SKIP: (Code continues here.)

Here TestFun may be some arbitrary nontrivial function that resets the zero flag. An automated tool cannot consider the call to TestFun to be equivalent to "cmp eax, eax" unless the tool actually analyzes code semantics. Even then, it is appreciated that the halting problem, which involves devising a general algorithm to determine whether any program halts or stops operation, discourages creation of tools sophisticated enough to analyze code semantics. The halting problem is provably undecidable (e.g., no such algorithm exists). Moreover, any nontrivial property of universal programs is similarly undecidable, so that only heuristics and other partially working methods can be used to analyze program semantics in general.

In another implementation, the obfuscated code may be as follows:

Call FN
cmp eax, const
jle AlwaysTaken
<useless code, possibly including some overlapped instructions>
<opcode for an instruction containing a 4-byte operand (e.g., MOV or CMP)>
Always Taken:
X:

Here FN is an obfuscated function and the eax register holds the output of FN. The function FN, which is difficult to analyze, returns a constant or variable within a certain range. For example, the function FN may be a cryptographic function that is difficult to analyze and guess its operation. After such a function returns, the program checks an output condition that always causes a branch into the middle of some disassembled code. The useless instruction should not be obvious. Therefore, a cryptographic code, that uses random numbers as constants to obfuscate the useless instruction, may be utilized.

Overlapped code segments having multiple overlapping paths of execution may also be created. In one implementation, two or more of the paths of execution are both actually useful and necessary. For example, the obfuscated code may be as follows:

Call TestFun
jne SKIP
_emit 0xb8
nop
SKIP: nop
nop
nop

If the call to TestFun sets the zero flag, EAX gets the value 0x90909090 (0x90 is the opcode for NOP). If the call to TestFun does not set the zero flag, EAX is left alone. The program may accordingly be arranged to rely on this behavior in order to work properly, so that it cannot be readily de-obfuscated.

Jump instructions provide the functionality to transfer execution and also to disguise the transfer of execution. Jump instructions may include simple indirect relative jump, indirect relative jump that simulates a function call, conditional indirect relative jump, chain instructions, or the like. Simple indirect relative jump patterns include a call statement to a specially designed function, where the return address (e.g., instruction pointer) is taken from the stack and an offset is added. A jump is then executed to the resulting destination address. In an x86 implementation, the indirect relative jump may be as follows:

FN: Add [esp], const
Ret
FOO: Call FN
<instruction bytes that contain a valid instruction at address FOO+const> wherein the entry point is at address FOO.

The indirect relative jump may be simulated by a function call. Immediately following the function call, a "useless" RET instruction is used to fool interactive disassemblers into marking the end of a "function" at FOO. In reality, the "function" at FN modifies its own return address on the stack, so that the RET instruction in FN causes a jump into the middle of the MOV instruction in FOO. For example:

FN: Push [esp]
Push eax
Lahf

[esp], 3
Sahf
Pop eax
Ret
FOO: Call FN
Ret
Move ax, <instruction>

In a conditional indirect relative jump, execution of each path is transferred into the middle of another instruction. In chain instructions, a simple relative short jump may be inserted into an instruction hidden within another instruction, such that the next instruction can also hide an instruction. Accordingly, the instructions output by a disassembler are not real instructions.

It is appreciated that multiple execution path based overlapped code works on platforms that support either fixed-length instructions or variable-length instructions. The above-described examples illustrate some of the many variants of overlapped code. The overlapped code may include necessary but nonequivalent code, equivalent but individualized code, overlapping instructions, and obfuscated branches, jumps, fake instructions, useless code and/or cold paths.

The resulting anti-disassembly obfuscated code is then output at 230. The particular path of the obfuscated code that is executed may be a function of one or more parameters, such as the current code path, program counter, time, running thread, program input, data derived from a program input, or the like. Such overlapped code complicates code analysis, decompiling, disassembly, patching and the like. For example, debuggers have problems setting breakpoints to stop the debugging process at the right place. Therefore, overlapped code causes the debugger to crash. The issue is that debuggers typically overwrite instructions when inserting breakpoints. Thus, when the debugger modifies the overlapped code block it destroys the information that is necessary for the execution path.

It is appreciated that the above-described method may be implemented manually, utilizing genetic algorithms, via automated maze generation and/or by performing an exhaustive search. The manual method may include creating anti-disassembly macros and parameterizing them for increased variability. For a genetic algorithm, random no-op instruction sequences or byte sequences are generated and sprinkled with "seed" instructions. The seed instructions may be short-range branches and jumps. The code pattern is generated by making slight random changes, until the resulting instructions form a valid no-op sequence. It is appreciated that there should be no obvious state saving and restoring operations for acceptable security. For automated maze generation, a random graph is created where the nodes are consecutive memory addresses and the edges indicate possible control transfer. For example the last byte of each instruction will have an edge to the first byte of the next instruction, and the last byte of each branch will have an edge to the destination address. Overlapped code may then be generated from the graph. An exhaustive search may be done to identify instruction sequences satisfying criteria such as no-op-ness and patterns corresponding to overlappable encodings.

Figure 3:
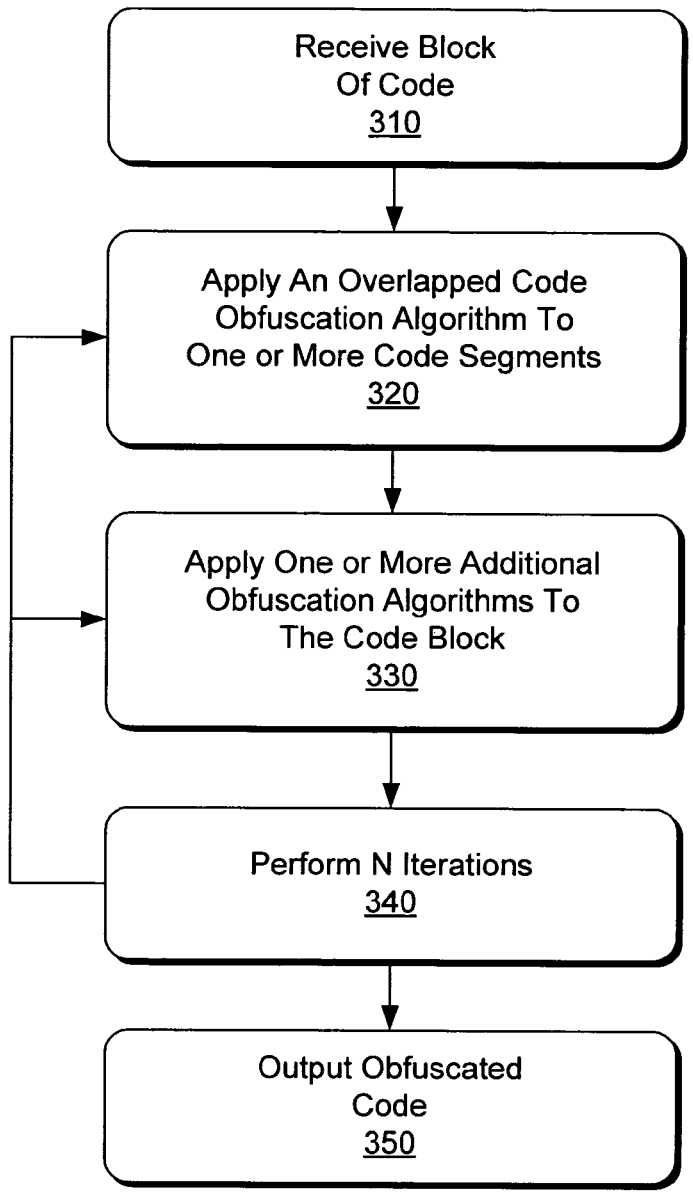
FIG. 3 shows a flow diagram of another method of obfuscating code.

FIG. 3 shows another method of obfuscating code. The method begins with receipt of a block of code, at 310. The block of code may be of any form, such as source code, intermediate code, binary code, or the like. At 320, a first obfuscation algorithm is applied to generate a first obfuscated code from the received block of code. At 330, a second obfuscation algorithm is applied to generate a second obfuscated code from the first obfuscated code. A select number of iterations of applying obfuscation algorithms are performed, at 340. In one or more iterations, the obfuscation algorithm creates overlapped code in one or more code segments of the received code block. In particular, one or more existing code segments are modified and/or additional code is injected therein to create overlapping instructions and/or multiple overlapping paths of execution. Each overlapped code segment performs a plurality of semantically different actions depending upon the context of execution. The particular action to be performed during execution may be a function of one or more operating conditions, such as the current code path, program counter, time, running thread, a current value of a variable, a program input, data derived from a program input, a current content of a register, or the like.

The obfuscation algorithms are repeatedly applied to the code segment, wherein the output of a previous obfuscation algorithm provides the input to the next obfuscation algorithm. It is appreciated that each iteration of code obfuscation 320, 330 may utilize the same obfuscation algorithm, or different obfuscation algorithms in any desired combination and/or in any sequence. Additional obfuscation algorithms, applied in one or more iterations, may include an oblivious hashing algorithm, a pointer conversion algorithm, a noise code injection algorithm, a control-flow alteration algorithm, and/or the like.

The final obfuscated code block may be output at 350. It is appreciated that a desired level of "confusion" and "diffusion" may be obtained as a function of the complexity of the one or more code transform techniques employed and the number of iterations thereof.

Figure 4:
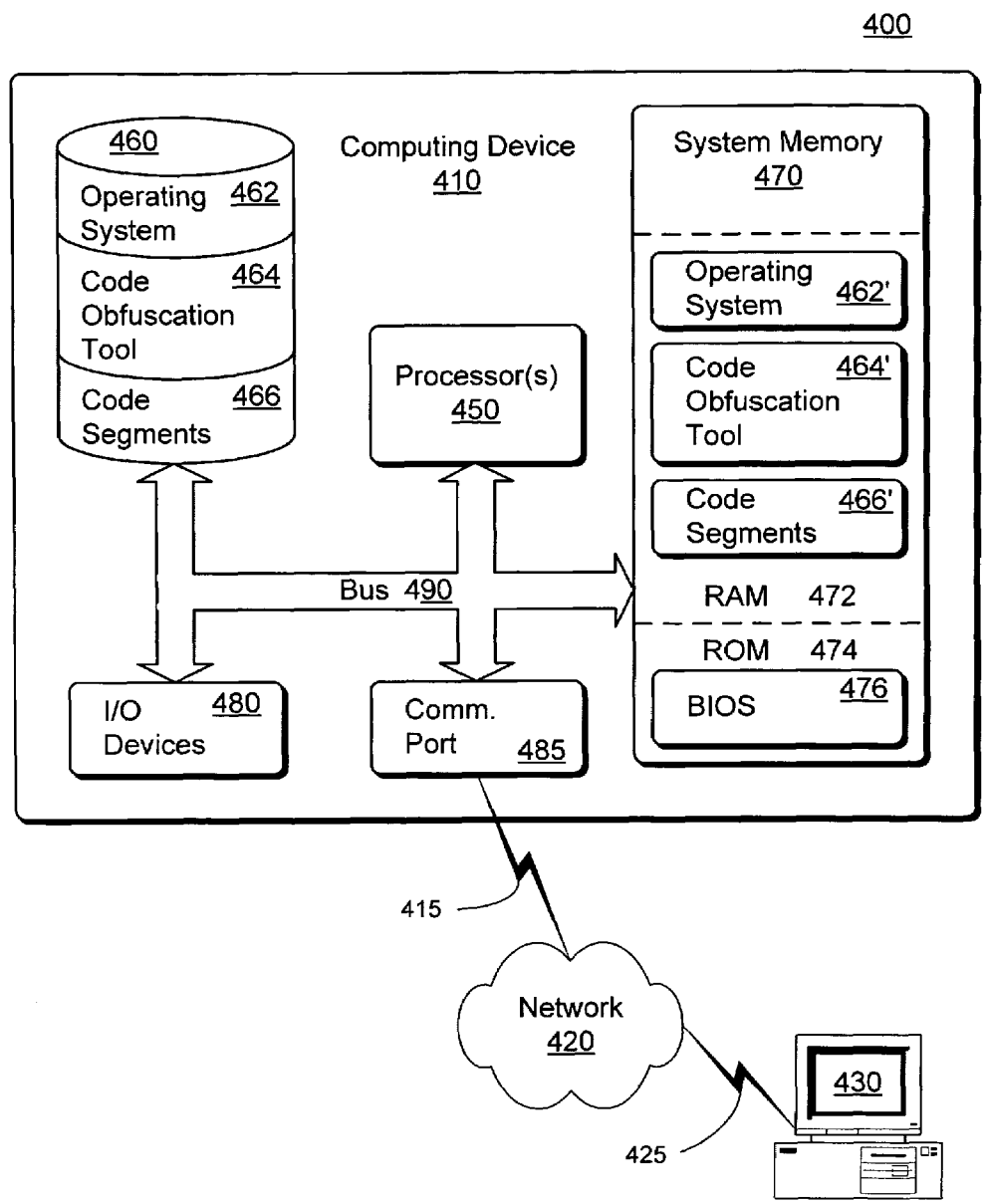
FIG. 4 shows a block diagram of an exemplary operating architecture for implementing an overlapped code obfuscation system.

FIG. 4 shows an exemplary operating architecture 400 for implementing an overlapped code obfuscation system. The exemplary operating environment 400 includes a computing device 410, which may be communicatively coupled to one or more other computing devices 430. The computing device 410 may be a personal computer, server computer, client computer, hand-held or laptop device, minicomputer, mainframe computer, distributed computer system and/or the like.

An exemplary computing device 410 may include one or more processors 450, one or more computer-readable media 460, 470 and one or more input/output devices 480, 485. The computer-readable media 460, 470 and input/output devices 480, 485 may be communicatively coupled to the one or more processors 450 by one or more buses 490. The one or more buses 490 may be implemented using any kind of bus architectures or combination of bus architectures, including a system bus, a memory bus or memory controller, a peripheral bus, an accelerated graphics port and/or the like. It is appreciated that the one or more buses 490 provide for the transmission of computer-readable instructions, data structures, program modules, code segments and other data encoded in one or more modulated carrier waves. Accordingly, the one or more buses 490 may also be characterized as computer-readable media.

The input/output devices 480, 485 may include one or more communication ports 485 for communicatively coupling the computing device 410 to the other computing devices 430. One or more of the other computing devices 430 may be directly coupled to one or more of the communication ports 485 of the computing device 410. In addition, one or more of the other computing devices 430 may be indirectly coupled through a network 420 to one or more of the communication ports 485 of the computing device 410. The networks 420 may include an intranet, an extranet, the Internet, a wide-area network (WAN), a local area network (LAN), and/or the like. The other computing devices 430 and networks 420 may include any kind of electronic or computer equipment, including personal computers, server computers, client computers, hand-held or laptop devices, set-top boxes, game consoles, programmable consumer electronics, routers, minicomputers, mainframe computers and/or the like.

The communication ports 485 of the computing device 410 may include any type of interface, such as a network adapter, modem, radio transceiver, or the like. The communication ports 485 may implement any connectivity strategies, such as broadband connectivity, modem connectivity, digital subscriber link (DSL) connectivity, wireless connectivity or the like. It is appreciated that the communication ports 485 and the communication channels 415, 425 that couple the computing devices 410, 430 provide for the transmission of computer-readable instructions, data structures, program modules, code segments, and other data encoded in one or more modulated carrier waves (e.g., communication signals) over one or more communication channels. Accordingly, the one or more communication ports 485 and/or communication channels 415, 425 may also be characterized as computer-readable media.

The computing device may 410 also include additional input/output devices 480, such as one or more display devices, keyboards, and pointing devices (e.g., a "mouse"). The input/output devices 480 may further include one or more speakers, microphones, printers, joysticks, game pads, satellite dishes, scanners, card reading devices, digital and video cameras or the like. The input/output devices 480 may be coupled to the bus 490 through any kind of input/output interface and bus structures, such as a parallel port, serial port, game port, universal serial bus (USB) port, video adapter or the like.

The computer-readable media 460, 470 may include system memory 470 and one or more mass storage devices 460. The mass storage devices 460 may include a variety of types of volatile and non-volatile media, each of which can be removable or non-removable. For example, the mass storage devices 460 may include a hard disk drive for reading from and writing to non-removable, non-volatile magnetic media. The one or more mass storage devices 460 may also include a magnetic disk drive for reading from and writing to a removable, non-volatile magnetic disk (e.g., a "floppy disk"), and/or an optical disk drive for reading from and/or writing to a removable, non-volatile optical disk such as a compact disk (CD), digital versatile disk (DVD), or other optical media. The mass storage devices 460 may further include other types of computer-readable media, such as magnetic cassettes or other magnetic storage devices, flash memory cards, electrically erasable programmable read-only memory (EEPROM), or the like. Generally, the mass storage devices 460 provide for non-volatile storage of computer-readable instructions, data structures, program modules, code segments, and other data for use by the computing device 410. For instance, the mass storage device 460 may store the operating system 462, the code obfuscation tool 464, the code segments 466, and other program modules and data.

The system memory 470 may include both volatile and non-volatile media, such as random access memory (RAM) 472, and read only memory (ROM) 474. The ROM 474 typically includes a basic input/output system (BIOS) 476 that contains routines that help to transfer information between elements within the computing device 410, such as during startup. The BIOS 476 instructions executed by the processor 450, for instance, causes the operating system 462 to be loaded from a mass storage device 460 into the RAM 472. The BIOS 476 then causes the processor to begin executing the operating system 462' from the RAM 472. The code obfuscation tool 464 and the code segments 466 may then be loaded into the RAM 472 under control of the operating system 462'. It is appreciated that the code segments 466' may also be received from one or more other computing devices 430.

The processor 450 of the computing device 410 executes various instructions of the code obfuscation tool 464' to transform the code segments 466' into overlapped code segments. In particular, the code obfuscation tool 464' modifies the existing code and/or injects additional code to create overlapping instructions and/or multiple overlapping paths of execution. In addition, the code obfuscation tool 464' may also apply one or more additional obfuscation algorithms, such as oblivious hashing, pointer conversion, noise code injection, control-flow alteration and/or the like. Furthermore, the overlapped code obfuscation algorithms and other obfuscation algorithms may be applied iteratively to the code segment 466'. In particular, the algorithms may be applied sequentially such that the output of the previous algorithm is the input to the next algorithm. One or more iterations may utilize the same or different obfuscation algorithms in any desired combination and/or in any sequence.

In one implementation, the code obfuscation tool 464' may create anti-disassembly obfuscated code having overlapping instructions protected by obfuscated branches. In another implementation, the code obfuscation tool 464' may create anti-disassembly obfuscated code having two or more overlapping paths of execution. In yet another implementation, the code obfuscation tool 464' may creating anti-disassembly obfuscated code having overlapping instructions and having two or more overlapping paths of execution. One or more of the overlapping instructions and/or the multiple overlapping paths of execution may be protected by obfuscated branches, jumps or other transfers of control.

The code obfuscation tool 464' may utilize manually created anti-disassembly macros that have been parameterized for increased variability. The code obfuscation tool 464' may also utilize genetic algorithms to generate anti-disassembly patterns. In a genetic algorithm, random no-op instruction sequences or byte sequences are generated and sprinkled with "seed" instructions. The seed instructions may be short-range branches and jumps. The process is performed, making slight random changes, until the resulting instructions form a valid no-op sequence. It is appreciated that there should be no obvious state saving and restoring operations for acceptable security. The code obfuscation tool 464' may also utilize maze-generated patterns. For automated maze generation, a random graph is created where the nodes are consecutive memory addresses and the edges indicate possible control transfer. For example the last byte of each instruction will have an edge to the first byte of the next instruction, and the last byte of each branch will have an edge to the destination address. Overlapped code may then be generated from the graph. The code obfuscation tool 464' may also perform a brute-force search to identify instruction sequences satisfying criteria such as no-op-ness and patterns corresponding to overlappable encodings.

The resulting anti-disassembly obfuscated code may be stored in one or more of the mass storage devices 470, 460 and/or transmitted to one or more other computing devices 430. The anti-disassembly obfuscated code performs a plurality of semantically different actions depending upon the context of execution. Furthermore, the anti-disassembly obfuscated code may have multiple layers of overlapped code, which increases the complexity of reverse engineering and/or makes the code tamper resistant.

The foregoing descriptions of specific embodiments have been presented for purposes of illustration and description. Numerous specific details were set forth in the detail description in order to provide a thorough understanding. However, it is understood that the present invention may be practiced without these specific details. In other instances, well-known methods, procedures, components, and circuits were not described in detail so as not to unnecessarily obscure aspects of the invention. The described embodiments are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of code obfuscation, comprising:
receiving a code segment;
applying a first obfuscation algorithm to the code segment to generate a first obfuscated code;
applying a second obfuscation algorithm, different from the first obfuscation algorithm, to the first obfuscated code to generate a second obfuscated code; and
iteratively applying one or more obfuscation algorithms to the second obfuscated code to create overlapped code, in the code segment, for performing a plurality of semantically different actions which depend upon a context of when the overlapped code is executed, the overlapped code resulting from either modifying the second obfuscated code or inserting additional code into the second obfuscated code,
wherein a particular one of the plurality of semantically different actions performed during execution is a function of one or more conditions of execution selected from a group consisting of a current code path, a program counter, a time, a running thread, a current value of a variable, a program input, data derived from a program input, and a current content of a register.

2. A method according to claim 1, wherein the creating the overlapped code comprises transforming the received code segment to include overlapping instructions.

3. A method according to claim 1, wherein creating the overlapped code comprises transforming the received code segment to include multiple overlapping paths of execution.

4. A method according to claim 1, further comprising obfuscating an instruction that transfers execution associated with the overlapped code.

5. A method according to claim 1, wherein a plurality of paths of execution in the overlapped code are useful.

6. A method according to claim 1, further comprising obfuscating a transfer of control to one or more of the plurality of semantically different actions.

7. A method of code obfuscation, comprising:
receiving a code block;
applying a first obfuscation algorithm to the received code block to generate a first obfuscated code;
applying a second obfuscation algorithm, different from the first obfuscation algorithm, to the first obfuscated code to generate a second obfuscated code; and
iteratively applying one or more obfuscation algorithms to the second obfuscated code, wherein at least one of the obfuscation algorithms creates overlapped code in a segment of the code block, the overlapped code performing a plurality of semantically different actions as a function of one or more conditions selected from a group consisting of a current code path, a program counter, time, running thread, a current value of a variable, a program input, data derived from a program input, and a current content of a register.

8. The method according to claim 7, wherein the overlapped code comprises overlapping instructions.

9. The method according to claim 8, further comprising obfuscating a transfer of control associated with the overlapping instructions.

10. The method according to claim 7, wherein the overlapped code comprises a plurality of overlapping paths of execution.

11. The method according to claim 10, further comprising obfuscating a transfer of control associated with one or more of the plurality of overlapping paths of execution.

12. The method according to claim 7, wherein iteratively applying one or more obfuscation algorithms to the code segment further comprises repeatedly applying one or more obfuscation algorithms to the code segment, wherein an output of a previous obfuscation algorithm provides an input to a next obfuscation algorithm.

13. The method according to claim 7, wherein the code segment comprises source code, intermediate code or binary code.

14. One or more computer-readable storage media having instructions that, when executed on one or more processors, perform acts comprising:
receiving a code segment;
applying a first obfuscation algorithm to the code segment to generate a first obfuscated code;
applying a second obfuscation algorithm, different from the first obfuscation algorithm, to the first obfuscated code to generate a second obfuscated code; and
transforming the second obfuscated code to perform a plurality of semantically different actions as a function of a context of execution of the second obfuscated code, the transforming comprising either modifying the second obfuscated code or inserting additional code into the second obfuscated code to create overlapped code, and the plurality of semantically different actions being selected from a group consisting of a current code path, a program counter, a time, a running thread, a current value of a variable, a program input, data derived from a program input, and a current content of a register.

15. The computing device of claim 14, wherein the transformed code segment comprises overlapping instructions.

16. The computing device of claim 14, wherein the transformed code segment further comprises overlapping instructions protected by an obfuscated jump.

17. The computing device of claim 14, wherein the transformed code segment comprises a plurality of overlapping paths of execution.

18. The computing device of claim 14, wherein the transformed code segment comprises a plurality of overlapping paths of execution protected by an obfuscated branch.

19. The computing device of claim 14, wherein the transformed code segment comprises one or more instructions selected from a group consisting of a branch, a jump, simple indirect relative jump instructions, indirect relative jump that simulates a function call, a conditional indirect relative jump, a chain instruction, a fake instruction, useless instructions, a cold path of instructions, equivalent but individualized instructions, necessary but nonequivalent instructions, and opaque predicate instructions.

20. The computing device of claim 14, wherein the code segment is transformed utilizing an anti-disassembly macro, a genetic algorithm, a maze generation algorithm or a brute-force search.

* * * * *